United States Patent [19]

Schmickl et al.

[11] 3,914,666

[45] Oct. 21, 1975

[54] CERAMIC CAPACITOR FOR USE WITH THIN LAYER CIRCUITS

[75] Inventors: Helfried Schmickl; Walter Kohlhammer, both of Deutschlandsberg, Austria

[73] Assignee: Siemens Aktiengesellschaft, Berlin & Munich, Germany

[22] Filed: Mar. 28, 1974

[21] Appl. No.: 455,781

[30] Foreign Application Priority Data

Apr. 9, 1973   Austria .................... 11307612/73

[52] U.S. Cl. ............ 317/261; 317/101 CC; 317/242
[51] Int. Cl.² .................... H01G 1/00; H01G 1/035
[58] Field of Search ...... 317/242, 261, 101 CC, 260

[56] References Cited
OTHER PUBLICATIONS

"Interim Report on the Metallized Products Co. High Voltage Metallized Capacitor" Report of Metallized Products Co., Inc., Norwalk, Conn. 1963 (Fig. 10 Rt. 21E Dow).

*Primary Examiner*—E. A. Goldberg
*Attorney, Agent, or Firm*—Hill, Gross, Simpson, Van Santen, Steadman, Chiara & Simpson

[57] ABSTRACT

A ceramic capacitor adapted for use with thin layer circuits, the capacitor having a hollow body composed of ceramic material with an inner continuous metal coating lining the hollow interior of the body. The ceramic body has a pair of opposed flat relatively wide sides and two opposed relatively narrow sides. A pair of outer metal coatings is provided, one on each of the relatively narrow sides, the outer coatings also extending along the relatively wide sides into confronting relation with each other, the spacing between the outer coatings being at least twice the wall thickness of the hollow body.

4 Claims, 7 Drawing Figures

U.S. Patent Oct. 21, 1975 3,914,666

CERAMIC CAPACITOR FOR USE WITH THIN LAYER CIRCUITS

BACKGROUND OF THE INVENTION

1. Field of the Invention

This invention is in the field of ceramic capacitors composed of a hollow ceramic body, with a metallic lining being provided on the hollow interior and a pair of outer metallic linings being provided in spaced relation on the outer periphery of the capacitor.

2. DESCRIPTION OF THE PRIOR ART

In U.S. Pat. No. 2,769,944 there is described a capacitor which has a tube-shaped hollow body composed of a dielectric material. Two electrode coatings are provided on the tube-shaped hollow body which are separated from each other in the direction of the tube axis and to which the connecting wires are applied. This prior art capacitor is not particularly suited for incorporation in a thin layer circuit because of its construction.

In German Pat. No. 1,064,574 there is described a capacitor which consists of a ceramic tube. This tube has an outer coating and an inner coating with the inner coating extending around a front side of the tube to the outside. This capacitor may be suitable for application in thin layer circuits, but the production of the inner coating which extends to the outside around the front end of the tube creates considerable difficulty.

In German Pat. No. 2,102,356 there is described a ceramic capacitor in the form of a hollow body. This capacitor has continuous inner and outer coatings to which the connecting wires are contacted.

SUMMARY OF THE INVENTION

This invention is directed to providing a ceramic capacitor for use in thin layer circuits, the capacitor having a large capacitance per unit of volume. The ceramic capacitor also has a large packing density and is suitable for mass production techniques.

The capacitor of the present invention consists of a hollow ceramic body which has two flat, relatively wide sides in opposed spaced relation with respect to each other and two relatively narrow sides in opposed spaced relation. The hollow interior of the ceramic body is provided with a continuous inner coating and the outer periphery of the ceramic body is provided with two coatings, each covering one of the relatively narrow sides and extending partially along the relatively wide flat sides so that the marginal edges of the two outer coatings are in confronting relationship. The spacing between the confronting ends of the outer coatings is made at least twice the wall thickness of the hollow body in order to prevent the possibility of electrical discharge between the two coatings.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
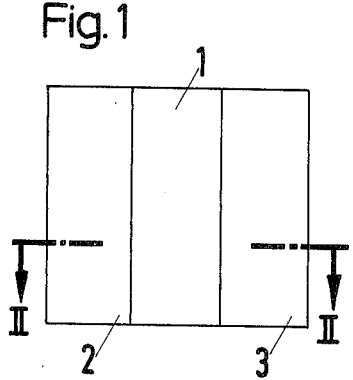
FIG. 1 is an enlarged plan view of a ceramic capacitor produced according to the present invention.
Figure 2:
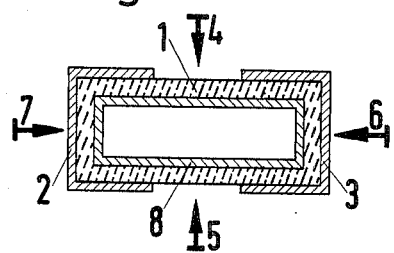
FIG. 2 is a cross-sectional view taken substantially along the line II—II og FIG. 1.

In FIG. 1, reference numeral 1 has been applied to a hollow ceramic body which has been provided with two outer metal coatings 2 and 3 whose confronting marginal edges are separated from each other, as best seen in FIG. 2. As also seen in that figure, the ceramic dielectric body 1 has two wide sides 4 and 5 which are in spaced opposed relationship and two relatively narrow sides 6 and 7 also in opposed parallel spaced relation so that the hollow body has a rectangular cross-section. A continuous metal coating 8 is provided on the inside of the hollow body. As best seen in FIG. 2, the two outer metal coatings 2 and 3 have their marginal confronting edges separated from each other by a space which preferably measures at least twice the wall thickness of the hollow body 1 in order to prevent an electrical discharge between the outer metal coatings 2 and 3.

Figure 3:
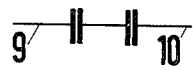
FIG. 3 is the equivalent circuit diagram of the capacitor.

In FIG. 3, there is shown the equivalent circuit diagram of ceramic capacitor which consists of two individual capacitors connected in series between conductor paths 9 and 10.

Figure 4:
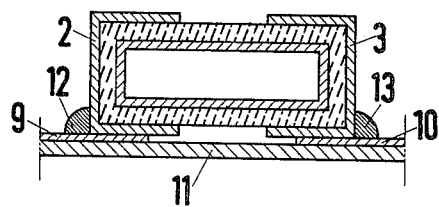
FIG. 4 illustrates the manner in which the capacitor is mounted into a thin layer circuit.

In FIG. 4, the ceramic capacitor is shown mounted in a thin layer circuit. The outer metal coatings 2 and 3 are soldered to conductor paths 9 and 10 of a thin layer circuit by means of solder deposits 12 and 13.

Figure 5:
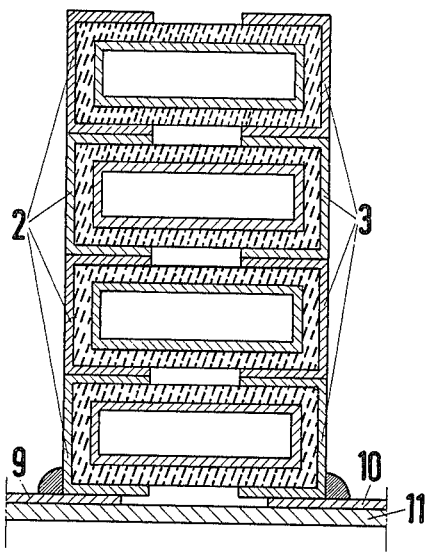
FIG. 5 illustrates the manner in which a block capacitor consisting of several individual capacitors can be stacked upon each other.

In FIG. 5, there is shown a stacked array of the capacitors constructed of several individual ceramic capacitors. As evident from that figure, the outer metal coatings of each of the capacitors are electrically connected and mechanically connected with each other on a substrate 11 having two conductor paths 9 and 10.

Figure 6:
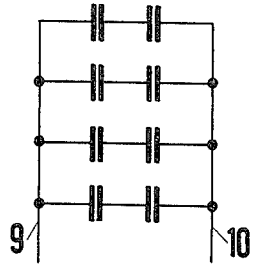
FIG. 6 represents the equivalent circuit diagram of the capacitor assembly shown in FIG. 5.

FIG. 6 illustrates the equivalent circuit diagram of the block capacitor shown in FIG. 5. As seen from this figure, the block capacitor consists of a parallel circuit of several capacitances, each two of which are connected in series between the conductor paths 9 and 10.

Figure 7:
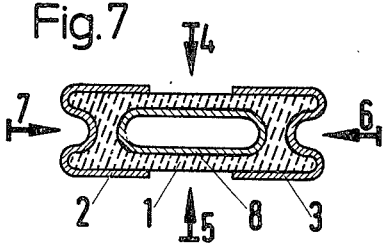
FIG. 7 is a cross-sectional view of still another form of ceramic capacitor produced according to the present invention.

In FIG. 7, there is illustrated in cross-section another embodiment of a ceramic capacitor produced according to the present invention. This form of the invention has narrow concave sides 6 and 7. If inner connections are not required, the outer coatings 2 or 3 may be conductively connected with the inner coating 8, for example, by a metallization bridge. A capacitor having a higher capacitance and a reduced dielectric strength is obtained by this variation.

The ceramic capacitor according to the present invention has several advantageous features. It can be produced by mass production techniques at relatively little expense. It is characterized by a high volume capacitance and can be employed in thin layer circuits with high packing density and with particularly good electrical reliability.

The construction of the capacitor according to the present invention also utilizes less ceramic materials. This is due to the fact that the capacitor can be considered as a series arrangement of two capacitances, whereby the inner connection takes over the function of the connecting electrode. Accordingly, double dielectric strength is achieved in the capacitor according to the present invention since the breakdown path corresponds to twice the wall thickness of the ceramic capacitor. A comparable capacitor of the common type of construction would have to have twice the ceramic thickness of a material having the same dielectric strength.

It should be evident that various modifications can be made to the described embodiments without departing from the scope of the present invention.

I claim as my invention:

1. A ceramic capacitor adapted for use with thin layer circuits comprising a hollow body composed of ceramic material, an inner continuous metal coating lining the hollow interior of said body, said body having a pair of opposed, flat relatively wide sides and two opposed relatively narrow sides, a pair of outer metal coatings, each outer coating covering one of the narrow sides and extending along said relatively wide sides into confronting relation with the other outer coating, the spacing between said outer coatings being at least twice the wall thickness of said hollow body.

2. The capacitor of claim 1 in which each of said relatively narrow sides is concave.

3. The capacitor of claim 1 in which said capacitor has a rectangular cross-section.

4. A capacitor stack consisting of a plurality of capacitors according to claim 1 bonded together with their outer coatings in electrical contact and being mechanically bonded together.

* * * * *